Dec. 1, 1931.  A. DINA  1,834,205
FRAMING MECHANISM
Filed May 19, 1925   3 Sheets-Sheet 1

INVENTOR
Augusto Dina
BY
Pane Carpenter
ATTORNEY

Dec. 1, 1931.  A. DINA  1,834,205
FRAMING MECHANISM
Filed May 19, 1925  3 Sheets-Sheet 2

INVENTOR
Augusto Dina
BY
Pierre Carpenter
ATTORNEY

Dec. 1, 1931.    A. DINA    1,834,205
FRAMING MECHANISM
Filed May 19, 1925    3 Sheets-Sheet 3

INVENTOR
Augusto Dina
BY
ATTORNEY

Patented Dec. 1, 1931

1,834,205

UNITED STATES PATENT OFFICE

AUGUSTO DINA, OF JERSEY CITY, NEW JERSEY, ASSIGNOR TO THE PRECISION MACHINE CO., INC., OF NEW YORK, N. Y., A CORPORATION OF NEW YORK

FRAMING MECHANISM

Application filed May 19, 1925. Serial No. 31,416.

The invention relates broadly to motion imparting and translating devices, and more particularly to an improved adjusting means adapted for employment in operating the framing mechanism of a motion picture apparatus.

This invention is described and illustrated as part and for the purpose of imparting the required movement to the framing mechanism of a motion picture projector, such, for instance, as the framing mechanism described and claimed in my Patent No. 1,746,385, Feb. 11, 1930, though the present invention finds a wide field of utility for other purposes.

In the framing mechanism of my aforesaid patent a lever is employed both for manipulating the framing mechanism and for synchronizing the shutter with the "frame", and it is one of the principal objects of the present invention to shorten the required stroke or range of movement of the said operating lever, in one form of this invention the lever stroke being reduced, and in another form a revoluble adjusting device being substituted for the lever, though the basic features are the same.

The principal objects and advantages of this invention reside in the provision of an improved motion imparting mechanism characterized by the provision of means for obtaining a predetermined displacement of certain elements with a minimum displacement of certain other elements; the provision of an improved means for operating the framing mechanism of a motion picture projector; the provision of an improved means for operating the framing and shutter compensating mechanisms of a motion picture projector; the provision of an improved lever operating mechanism; the provision of an improved means of the character described, which is interchangeable with various mechanisms; and the provision of an improved means for translating or transmitting motion of predetermined extent to an element and including motion reducing means.

This invention is further characterized by the provision of means in a motion picture projection apparatus for operating the framing and shutter compensating mechanisms from the rear of the machine so that this operation may be conveniently performed by the operator; the provision of a mechanism of the character referred to wherein the moving parts thereof are operable to a large degree in one vertical plane, thus reducing the space taken up by the apparatus; and the provision of a device of the character described in which the means for operating the framing mechanism may be removed substantially as a unit for repair, replacement or adjustment.

The foregoing and such further objects and advantages as may appear or be pointed out as this description proceeds are attained in the structural embodiment illustrated in the accompanying drawings; in which:

Figure 5 is a fragmentary view similar to Figure 1 of an alternative form of this invention;

Figures 2, 3:
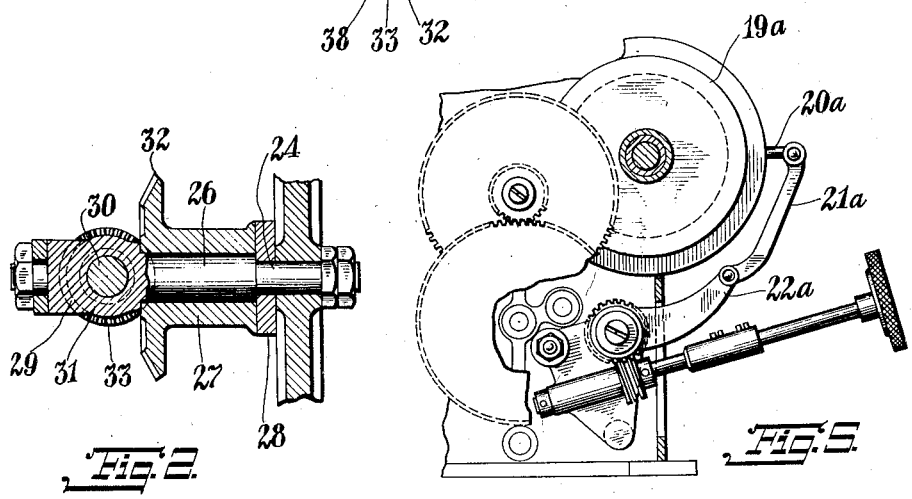
Figure 2 is an enlarged sectional view taken on the line 2—2 of Figure 1, looking in the direction indicated by the arrows.
Figure 3 is an enlarged fragmentary top plan view, parts in section, of the device of Figure 1.
Figure 3:
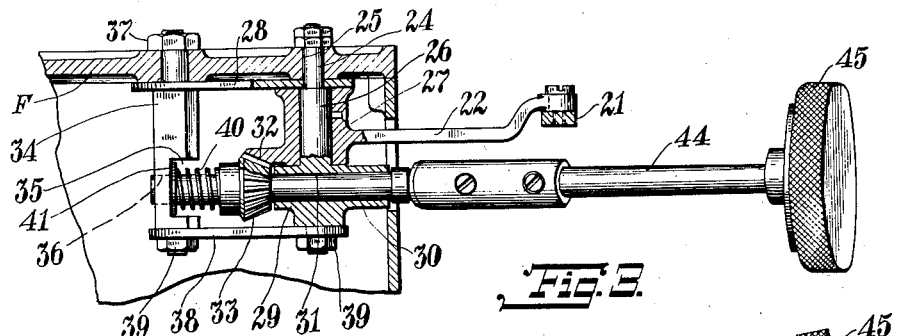
Figure 4:
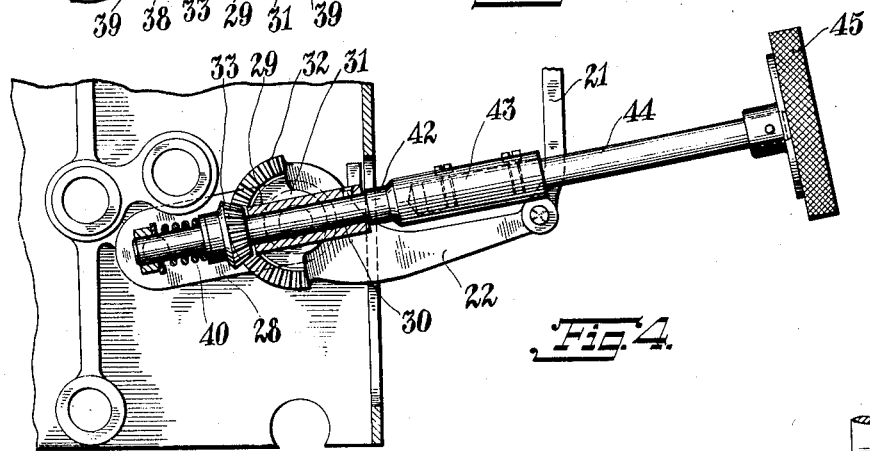
Figure 4 is an enlarged fragmentary side elevational view of the device shown in Figure 3.
Figures 6, 7:
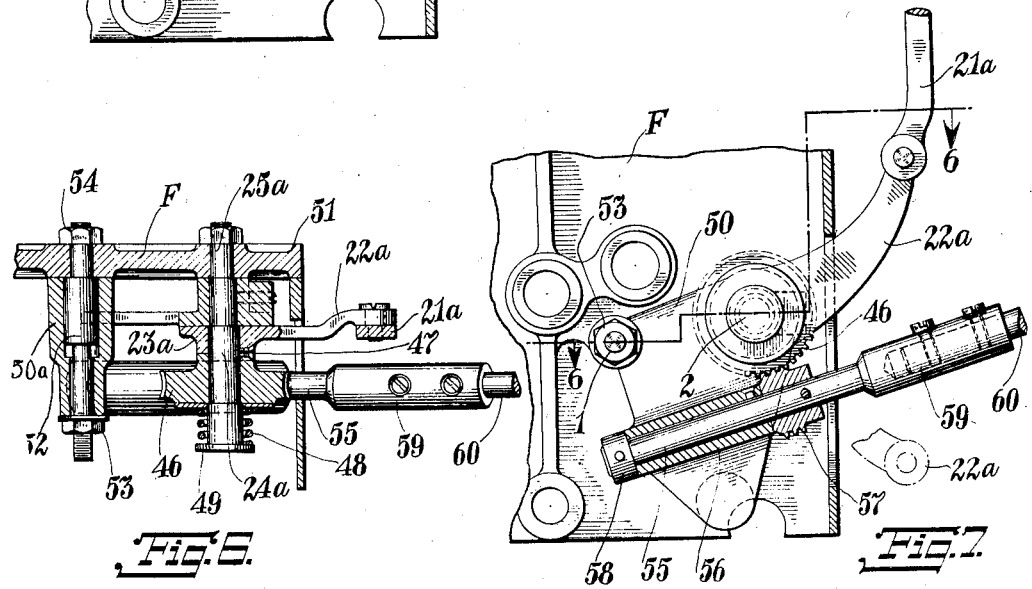
Figure 8:
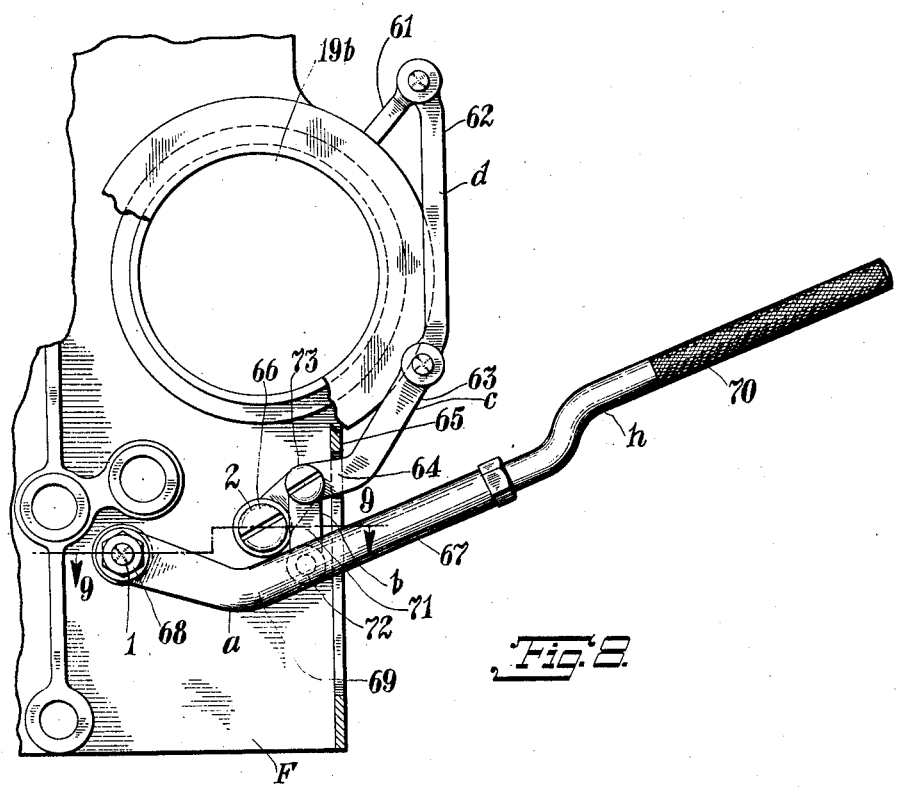
Figure 9:
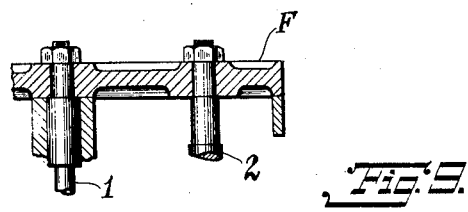

Figures 6 and 7 are views similar to Figures 3 and 4, further illustrating the device of Figure 5; and Figures 8 and 9 are fragmentary elevational and transverse sectional views, respectively, illustrating an alternative form of my invention applied to a prior art device, that is, to the frame gear box and lever bearings of a motion picture projector.

Figure 1:
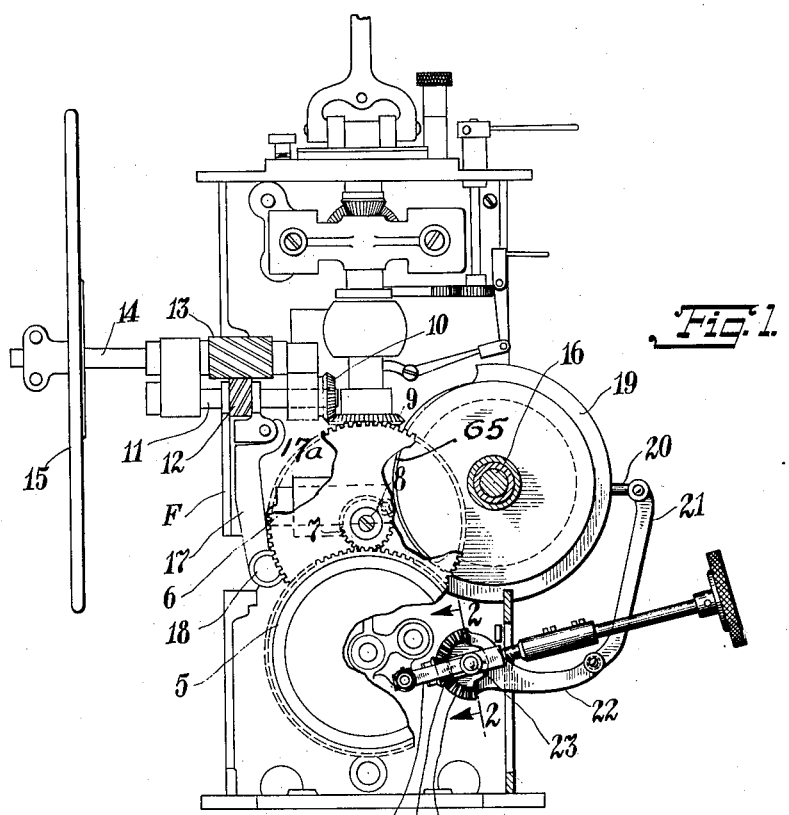
Figure 1 is a side elevational view of a motion picture projector embodying the improvements of this invention.

Referring now more particularly to the drawings, and first to Figures 1 to 4, I have illustrated, as in Figure 1, a form of motion picture projector in which the present invention finds particular utility, the frame F serving to support the various parts of the projector, this description pertaining only to such parts as may be pertinent and necessary to a clear understanding of this invention.

Parts of the projector mechanism are, of course, omitted, the essentials for a complete understanding of this invention including in part the gear train shown in Figure 1 and including the gears 5, 6, these gears being operatively connected by a pinion 7 on the shaft 8 of the gear 6.

The gear 6 is in mesh with the bevel pinion 9, which in turn drives a bevel pinion 10 mounted upon and serving to drive a countershaft 11. This countershaft carries a worm or spiral gear 12 which meshes with a complemental spiral gear 13 on the shutter 14, which latter carries the shutter 15 of an approved type usually employed for preventing flicker in motion pictures projected by the apparatus. Those skilled in the art will understand that the shutter must operate synchronously with the film feeding sprocket (not shown), but which in the machine shown would be mounted upon the shaft 16.

In order that the shutter be synchronized with a "frame" of the picture, it is necessary that the shutter be given a partial rotation independently of its rotation by virtue of the normal operation of the shaft on which it is mounted, and to this end I provide the spiral gearing 12—13, whereby a partial rotation may be imparted to the gear 13 by sliding the gear 12 on its shaft 11. The lever 17 is actuated by a plunger 17a moved by a cam 65 on the means hereinafter described for operating the framing mechanism.

The framing mechanism includes here the casing 19, the details of the framing means being omitted, said casing having a portion thereof carrying a part of the intermittent couple (not shown) displaceable to impart a partial rotation to the film feeding sprocket and thus accomplish the framing operation. Reciprocation of the plunger 17a by the cam 19a actuates the lever 17 to operate the shutter with the framing mechanism.

In the form of the invention shown in Figure 1, the movable part of the framing mechanism is provided with a lug 20 which is pivotally connected to a link 21, which latter is pivotally connected to a rocker-arm 22, said rocker arm being mounted upon a suitable fulcrum 23, which, as shown in Figure 2, includes a bolt 24 fixedly mounted in a suitable opening 25 in one side of the frame F, and provided with an enlarged sleeve portion 26 thereon for supporting the hub 27 of the rocker arm 22.

The inner ends of the sleeve 26 and hub 27 abut the carrier plate 28, disposed between said hub and the frame F, and the outer end of the sleeve 26 is provided with an enlarged head 29 which serves as a bearing for the manipulating shaft 30, which latter operates in a transverse opening 31 in said head.

The hub 27 is provided with a segmental beveled gear 32, preferably the spiral form, which meshes with a complemental spiral beveled pinion 33 secured to and rotatable with the shaft 30. The shaft 30 at its inner end is supported in a bearing bracket 34 provided with a recess 35 and an opening 36 for reception of the shaft, said bearing bracket 34 passing through the plate 28 and being secured by a nut 37 to the frame F.

The gear 32 and pinion 33 are preferably spiral in form for the reason that the desired velocity ratio may be obtained without material change in the mechanism.

The outer end of the bearing bracket 34 is maintained rigid by the provision of a strap 38 extending between said bracket and the head 29, said strap being secured in position by the nuts 39.

Between the pinion 32 and the bearing bracket 34, I provide a friction spring 40 which surrounds the shaft 30 and abuts said pinion and a plate 41 seated in the recess 35 The spring 40 tends to maintain the pinion 33 in mesh with the segmental gear 32 and the shaft 30 is prevented against longitudinal movement to the left by said spring co-operating with an annular abutment 42 carried by the shaft and engaging the head 29. The abutment 42 is enlarged and provided with socket 43 which receives a removable handle member 44 provided with a handle 45 whereby the shaft 30 may be rotated for imparting oscillating movement to the rocker arm 22 and thus adjusting the framing mechanism.

In the alternative form of the invention shown in Figures 5 to 7, the framing device 19a is shown provided with a lug 20a connected by a link 21a to a rocker arm 22a, the latter being provided with a hub portion 23a rotatable upon a fulcrum bolt 24a fixedly secured in the frame F as indicated at 25a. The hub 23a is connected to a worm gear 46 rotatable on the fulcrum 24a by the provision of a connecting key in the form of a screw 47 as shown in Figure 6, and said pinion is maintained in such engagement by the provision of a friction spring 48 interposed between the head 49 and the fulcrum 24a and said worm gear shown in Figure 6.

The fulcrum 24a also serves to support in part a carrier frame 50 which has a portion 51 thereof disposed between the arm 22a and the frame F, said frame 50 being further fixedly secured in position by the provision of an integral hollow standard 50a through which a retaining bolt 52 extends, said bolt being secured in said standard and in the frame F by the provision of retaining nuts 53 and 54.

For imparting movement to the worm gear 46 for oscillating the rocker arm 22a, I provide an actuating shaft 55 rotatably mounted in a bearing member 56 fixedly carried by the frame 50, said shaft having a worm 57 fixedly secured thereto and in operative engagement with the worm gear 46, said pinion abutting one end of the bearing 56, and a collar 58 on said shaft 55 abutting the other end of said bearing to prevent longitudinal displacement of the shaft 55.

The shaft 55 is enlarged as at 59 to receive a handle member 60 similar to the handle 44, whereby rotation of the shaft 55 may be readily accomplished for oscillating the rocker arm 22a and thus adjusting the framing mechanism.

In the forms of my invention shown in Figures 1 to 7 it will be understood that in adjusting the framing mechanism, the shutter compensating mechanism is also adjusted to synchronize the shutter with the "frame" and this may be accomplished by suitable connections such as those shown in the application referred to.

Referring now to Figures 8 and 9, which is in part a form of prior art structure, the conventional frame F supports the picture framing mechanism 19b of conventional form, and the latter in my invention is provided with the lug 61 connected by a link 62 to a rocker arm 63, said rocker arm having an offset portion 64 which is employed as a stop to engage a part 65 of said frame F on the said rocker arm, being pivotally mounted on a suitable fulcrum 66 attached to the frame F.

Means for actuating the rocker arm through its complete arc of displacement by functioning so as to reduce the required amount of movement of such actuating means includes the lever 67 mounted on a suitable fulcrum 68 provided on the frame F, said lever being bent as at 69 to avoid premature contact with the fulcrum 66 and also to permit interchangeability of the mechanisms of Figures 1 to 7 with the device of Figure 8. The lever 67 is provided with a handle member 70 by which said lever may be displaced about the fulcrum and a link 71 is pivotally connected at 72 to the lever 67 and at 73 to the rocker arm 63 whereby to connect these elements for simultaneous displacement.

It will be observed that a displacement vertically of the lever 67 to a predetermined arc will impart movement in the same direction to the lever 63 but cause said lever to be displaced to a greater distance due to the provision of the reducing link 71, thus performing an analogous function to that performed by the devices shown in Figures 1 to 7. It will be observed that all of the devices of Figures 1 to 7 are applicable to the frame F shown in Figure 9 without alteration thereof, the various elements and forms of the structure being interchangeable, that is, the fulcrums 66 and 68 correspond to the parts 24a and 52 of Figures 5 to 7 and also correspond to the fulcrums 26 and 34 of Figures 1 to 4, so that substitution of one of the improved forms of the actuating mechanism for another form or for the prior art device does not require any alteration in the frame F, or any material alteration in the location of the fulcrums or bearings employed, thus affording an improved structure which may be readily applied to the existing frame.

Having thus described my invention and illustrated its use, what I claim as new and desire to secure by Letters Patent is:—

1. In a device of the character described forming a unit structure for installation, including a carrying member, a fulcrum on said member, a rocker arm mounted upon said fulcrum, a revoluble shaft mounted upon said carrying member at substantially a right angle to said fulcrum, and means connecting said shaft to said rocker arm for angularly displacing same.

2. The combination with a motion picture projector having a framing device and means to operate the shutter simultaneously therewith, of means for imparting a partial rotation to said framing device including a rocker arm connected to the framing device, a rotatable shaft operating in a plane intersecting the axis on which said rocker arm moves, and a gear train between and operatively connecting said rocker arm and shaft.

3. The combination with a motion picture projector having a framing device and means to operate the shutter simultaneously therewith, of means for imparting a partial rotation to said framing device including a rocker arm connected to the framing device, a rotatable shaft operating in a plane intersecting the axis on which said rocker arm moves, a gear train between and operatively connecting said rocker arm and shaft, and means for supporting said rocker arm, gear train, and shaft as a unitary structure on said projector.

4. In a device of the character described, in combination a support, a rotatable framing device thereon, a rotatable shutter, a displaceable gear train for said shutter, means for imparting a partial rotation to the framing device including a carrying member fixed to said support, a rocker arm mounted for angular movement on said carrying member, a gear train on the latter which actuates said rocker arm, and means forming a connection with said gear train for relatively displacing said first mentioned gear train for imparting a partial rotation to the shutter.

5. In a motion picture projector, in combination, a supporting frame, a framing mechanism including an element to be moved in a curved path, an actuating element therefor also movable in a curved path and arranged on said supporting frame below and in a plane substantially parallel to that of said element to be moved, and a manually operable member movable on said supporting frame below and connected to said element to be moved through a link from said actuating element so pivoted that the required movement of said manually operable member to produce a predetermined movement of the element to be moved is reduced.

6. In a device of the character described, in combination, a motion picture projector having a framing device including an element to be moved in a curved path, and mounted on the main frame of the projector, a rocker arm connected to said element to be moved arranged below the latter on said main frame, a relatively stationarily mounted revoluble shaft arranged with its axis transverse to that of the rocker arm and operatively connected to impart movement to said rocker arm and a manipulating member for said shaft.

7. In a motion picture projector, in combination with the frame thereof and a framing mechanism therefor, a detachable supporting member attached to said frame beneath said framing mechanism, an operating handle, also mounted on said supporting member, and gearing on said supporting member forming a connection between said operating handle and said framing mechanism, said supporting member comprising a plate bolted at two points to said frame, and removable with said handle from said frame as a unit, one of the bolts forming a bearing for a part of said gearing.

In testimony whereof I have hereunto signed my name.

AUGUSTO DINA.